United States Patent

Norkey et al.

Patent Number: 5,553,899
Date of Patent: Sep. 10, 1996

[54] MOLDED QUICK CONNECT COUPLING

[75] Inventors: Phillip Norkey, Jackson; Stephen Anderson, Livonia, both of Mich.

[73] Assignee: Pilot Industries, Inc., Dexter, Mich.

[21] Appl. No.: 445,278

[22] Filed: May 19, 1995

[51] Int. Cl.⁶ .................................................. F16L 37/22
[52] U.S. Cl. .................................................. 285/316
[58] Field of Search .................................. 285/316, 317, 285/315, 314; 137/614.03, 614.01, 614

[56] References Cited

U.S. PATENT DOCUMENTS

| | | | |
|---|---|---|---|
| 3,390,898 | 7/1968 | Sumida | 285/316 |
| 3,761,117 | 9/1973 | Shendure | 285/316 |
| 4,014,467 | 3/1977 | Ferguson | 285/316 |
| 4,198,080 | 4/1980 | Carpenter | 285/316 |
| 4,543,993 | 10/1985 | Calvin et al. | 285/316 |
| 5,310,226 | 5/1994 | Norkey | 285/316 |

FOREIGN PATENT DOCUMENTS

| | | | |
|---|---|---|---|
| 732985 | 4/1966 | Canada | 285/316 |
| 1675364 | 12/1970 | Germany | 285/316 |

*Primary Examiner*—Eric K. Nicholson
*Attorney, Agent, or Firm*—Gifford, Krass, Groh, Sprinkle, Patmore, Anderson & Citkowski

[57] ABSTRACT

A quick connect coupling is disclosed of the type adapted for connection to a nipple having a radially inwardly extending recess formed at a position spaced from a free end of the nipple. The quick connect coupling includes a tubular and cylindrical body open at each end wherein one end of the body is dimensioned to slidably extend over the free end of the nipple to a connected position. The body includes a plurality of circumferentially spaced openings which are in alignment with the nipple recess when the coupling is moved to its connected position. A spherical retainer is disposed in each opening and is radially movable between a locked and an unlocked position. A tubular and cylindrical locking ring normally urges the retainers to their locked position. Each housing opening has at least one side wall which extends substantially perpendicular from a predetermined diameter of the body. This enables the body to be molded from a two-part mold without the necessity of insert molding.

10 Claims, 2 Drawing Sheets

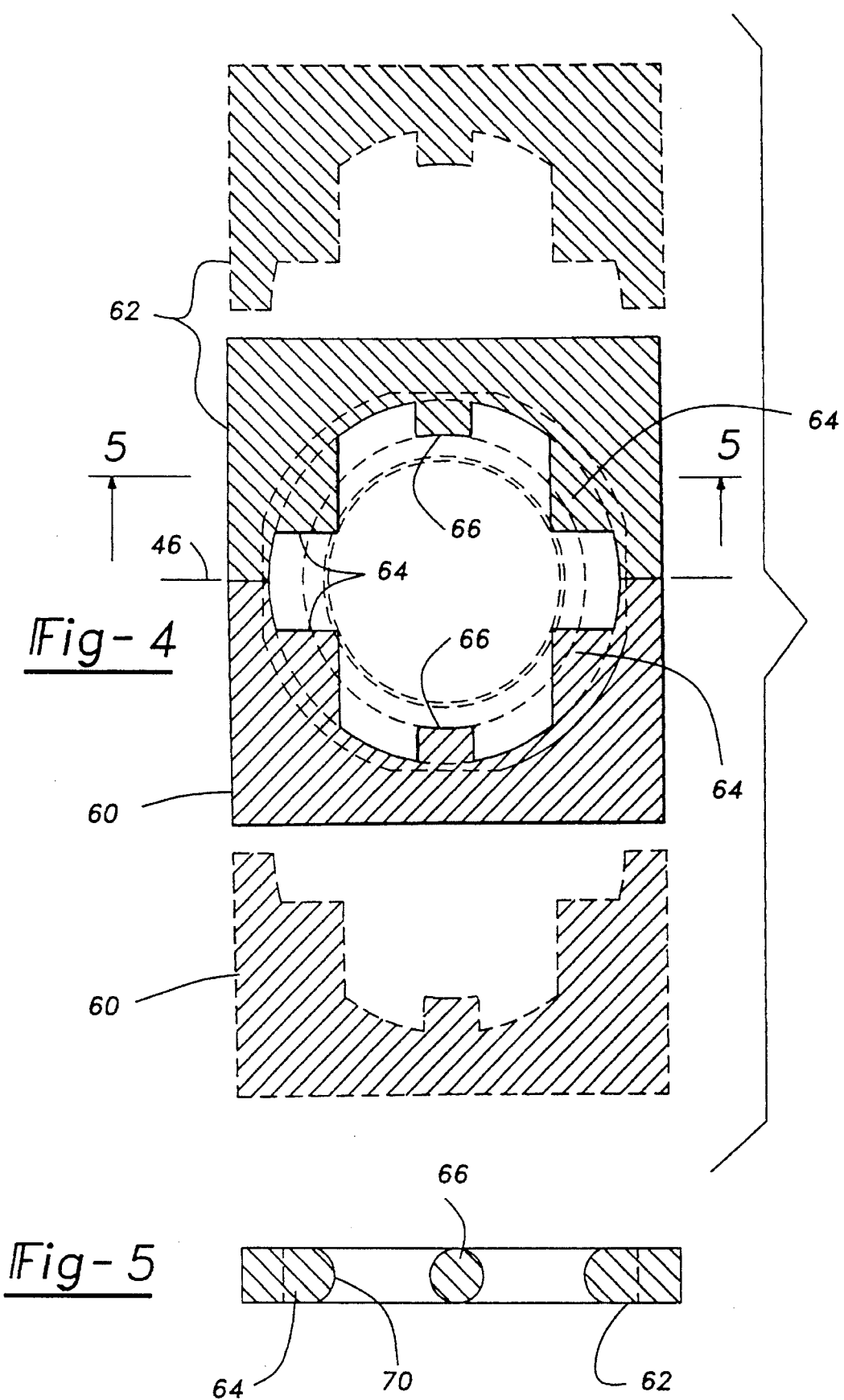

MOLDED QUICK CONNECT COUPLING

BACKGROUND OF THE INVENTION

1. Field of the Invention

The present invention relates generally to quick connect couplings.

2. Description of the Prior Art

There are many previously known quick connect couplings which are designed for connection with a nipple having a radially inwardly extending annular recess formed about the nipple at a positioned spaced from its end. These previously known quick connect couplings typically comprise an elongated tubular and cylindrical housing having one end adapted to be slidably positioned over the nipple to a connected position.

A plurality of spherical retainers are contained within openings formed circumferentially around the body such that the body openings register with the nipple recess when the coupling is moved to its connected position. Furthermore, the spherical retainers are movable between an inner locked position and an outer unlocked position. In their inner locked position, a portion of each ball is positioned within the nipple recess thus locking the coupling and nipple together. Conversely, with the spherical retainers moved radially outwardly to their unlocked position, the nipple and coupling are freely slidable relative to each other.

These previously known quick connect couplings also include a locking ring disposed coaxially around the body. This locking ring is axially movable between a retracted and an extended position. A cam surface on the locking ring cooperates with the spherical retainers to urge the spherical retainers towards their inner locked position as the locking ring is moved from its retracted to its extended position.

Typically at least three and usually six or more spherical retainers are provided within the quick connect coupling in order to secure the coupling to the nipple. Furthermore, these previously known spherical retainers are typically circumferentially equidistantly spaced from each other.

Although many previously known quick connect couplings, particularly metallic quick connect couplings, are manufactured by conventional machining operations, quick connect couplings formed of synthetic materials, such as plastic, can be manufactured much more inexpensively than metallic quick connect couplings. It would be particularly advantageous to manufacture the quick connect coupling, i.e. the body and locking ring, by molding.

One problem, however, arises when the body of the quick connect coupling is manufactured by the previously known molding operations. In particular, in the previously known quick connect couplings, the body openings which contain the retainers are generally cylindrical in shape and extend in a radial direction with respect to the axis of the body. Consequently, assuming that the coupling body is manufactured from a two-piece mold and the coupling includes at least six retainers, at least four of the openings formed to the body to contain the retainers are formed along an axis oblique to the parting axis of the mold halves.

Since at least some of the housing openings are formed along an axis oblique to the parting axis of the mold halves, it is not possible to use a simple two-piece mold. Instead, more complex, and more expensive, insert molding techniques must be employed. Insert molding techniques, however, disadvantageously increase the overall cost of the molding process and thus the cost of the part.

SUMMARY OF THE PRESENT INVENTION

The present invention provides a molded quick connect coupling which overcomes all of the above-mentioned disadvantages of the previously known devices.

In brief, the quick connect coupling of the present invention comprises a tubular and cylindrical housing open at each end wherein one end of the body is dimensioned to slidably extend over a nipple. As in the previously known devices, the nipple includes a radially inwardly extending annular recess formed at a predetermined position from the free end of the nipple.

The body includes a plurality of circumferentially spaced openings formed at a position spaced from one end of the body and these openings align with the nipple recess when the coupling is in a connected position.

A spherical retainer is disposed in each body opening and these spherical retainers are movable between a radially inner locked position and a radially outer unlocked position. In their locked position, a portion of each spherical retainers is positioned within the nipple recess thus locking the coupling and nipples together. Conversely, with the retainers in their outer position, the nipple and coupling are freely axially movable relative to each other.

An annular locking ring is disposed coaxially around the body and is movable axially between a retracted and extended position. The cam surface on the locking ring cooperates with the spherical retainers to urge the spherical retainers toward their inner locked position as the locking ring moves from its retracted to its extended position. The compression spring urges the locking ring towards its extended position.

The body of the quick connect coupling is manufactured using a simple two-piece mold. Unlike the previously known devices, the openings formed through the housing which contain the coupling are not all cylindrical in cross-sectional shape. Instead, the side wall of each housing opening closest to a center line bisecting a predetermined diameter extends in a direction which intersects the predetermined diameter of the body at an angle of 90° or less relative to the center 59 of the coupling. This predetermined diameter represents the parting line for the mold halves of a two-piece mold.

Since at least one side wall of each body opening is generally perpendicular to the predetermined diameter, the body openings are formed without the necessity of the previously known insert molding techniques.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 4 is an exploded diagrammatic view taken substantially along line 4—4 in FIG. 3;

FIG. 5 is a sectional view taken along line 5—5 in FIG. 4; and

DETAILED DESCRIPTION OF A PREFERRED EMBODIMENT OF THE PRESENT INVENTION

Figure 1:
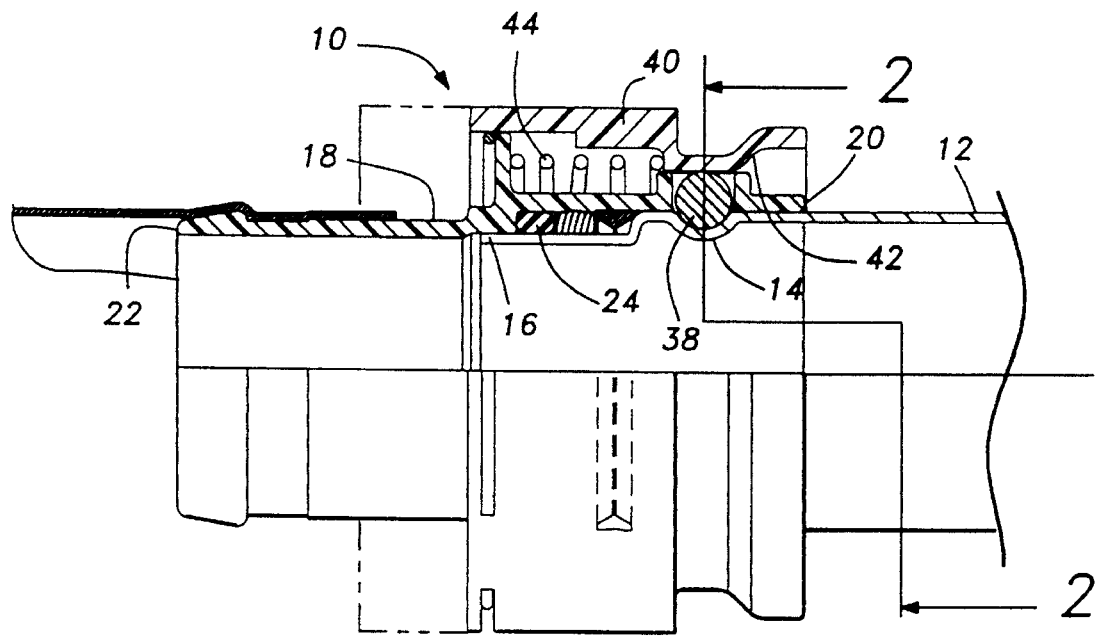
FIG. 1 is a longitudinal sectional view illustrating a preferred body of the present invention.
Figure 2:
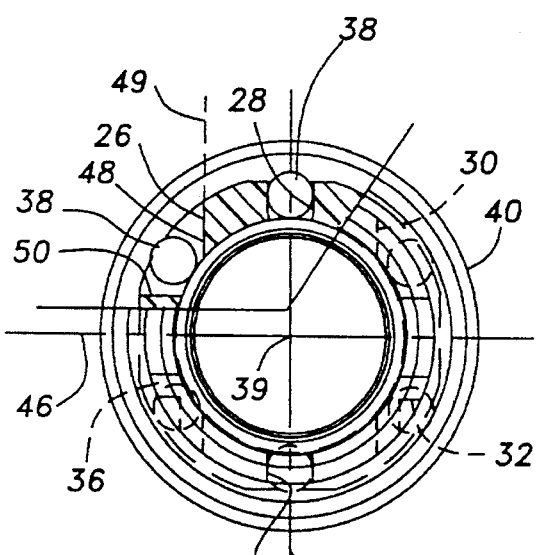
FIG. 2 is a sectional view taken substantially line 2—2 in FIG. 1.

With reference first to FIGS. 1 and 2, a preferred embodiment of the quick connect coupling 10 of the present invention is thereshown of the type adapted to a connection with a nipple 12. The nipple 12 is of the type having a radially inwardly extending recess 14 formed annularly around the nipple 12 at a position spaced from one end 16. Such a nipple 12, for example, is found on a gas tank for an automotive vehicle.

The quick connect coupling 10 includes an elongated tubular and cylindrical housing 18 open at each end 20 and 22. The end 20 of the housing 18 is dimensioned to slidably receive the nipple 12 to a connected position illustrated in FIG. 1. Furthermore, as shown in FIG. 1, a resilient O-ring 24 carried by the body 18 fluidly sealingly engages the outer periphery of the nipple 12 when the nipple 12 is in its connected position.

Referring now to FIGS. 1 and 2, a plurality of circumferentially spaced openings 26, 28, 30, 32, 34 and 36 are formed through the body 18 so that the openings 26–36 are circumferentially spaced from each other and, preferably, circumferentially equidistantly spaced from each other. The precise geometry of the openings 26–36 will be subsequently described in greater detail.

Still referring to FIGS. 1 and 2, a spherical retainer 38 is disposed within each body opening 26–36. Furthermore, with the coupling 10 moved to its connected position relative to the nipple 12 (FIG. 1) the openings 26–36, as well as the retainers 38 register with the annular nipple recess 14.

The retainers 38 are radially movable between an inner locked position, illustrated in FIG. 1 and the radially outer unlocked position. In their locked position, a portion of each retainer 38 is positioned within the nipple recess 14 thus locking the coupling 10 and nipple 12 together. Conversely, with the retainers 38 in their unlocked position, the retainers 38 are moved out of the nipple recess 14 thus allowing the nipple 12 and coupling 10 to axially slide relative to each other.

With reference now to FIG. 1, an annular locking ring 40 is disposed coaxially around the body 18. This locking ring 40 is movable between a retracted position, illustrated in phantom line, and an extended position, illustrated in solid line. The locking ring 40 includes a cam surface 42 which cooperates with the retainers 38 to force the retainers 38 toward their radially inner locked position as the locking ring 40 is moved from its retracted and to its extended position. A compression spring 44 urges the locking ring 40 towards its extended position.

With reference now especially to FIG. 2, each opening 26, 30, 32 and 34 includes a side wall closest to a line 37 which perpendicularly bisects a diameter 46. This sidewall extends in a direction which intersects the diameter 46 at an angle α (FIG. 6) of 90° or less relative to the center 39 of the coupling. Furthermore, this relation is required only for the openings 26, 30, 32 and 36 which do not lie on the center line 37 of the coupling.

For example, the side wall 48 of the opening 26 extends in the direction indicated by line 49 and is generally perpendicular to the diameter 46 while its other side wall 50 is generally parallel to the diameter 46 so that the opening 26 is generally in the shape of a quarter circle. The same is also true for the openings 30, 32 and 36.

Conversely, the sidewalls of the openings 28 and 34 which lie on the center line 37 are either perpendicular to the diameter 46 or flare slightly outwardly from the center line 37.

Figure 6:
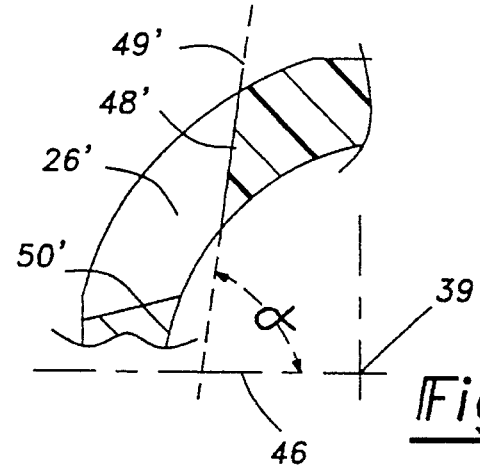
FIG. 6 is an enlarged fragmentary sectional view illustrating a portion of the coupling.

With reference now to FIG. 6, a modification is shown in which the sidewall 48' of the opening 26 extends in a direction indicated by line 49. This line 46 intersects the diameter at an acute angle α relative to the coupling center 39. Similarly, the direction of the other side 50' of the opening 26' also intersects the diameter 46 at an acute angle relative to the center 39.

Conversely, the openings 28 and 34 are substantially cylindrical in cross-sectional shape and aligned with a perpendicular to the diameter 46. As such, all of the side walls of the openings 28 and 34 are substantially perpendicular to the predetermined diameter 46. A reduced diameter portion is provided at the radially inner end of each opening 28 and 34.

The cross-sectional area of each opening 26–36 on the inside diameter of the body 18 is smaller than the cross-sectional area of the spherical retainers 38. Thus, the spherical retainers 38 are entrapped between the locking ring 40 and body 18.

Figure 3:
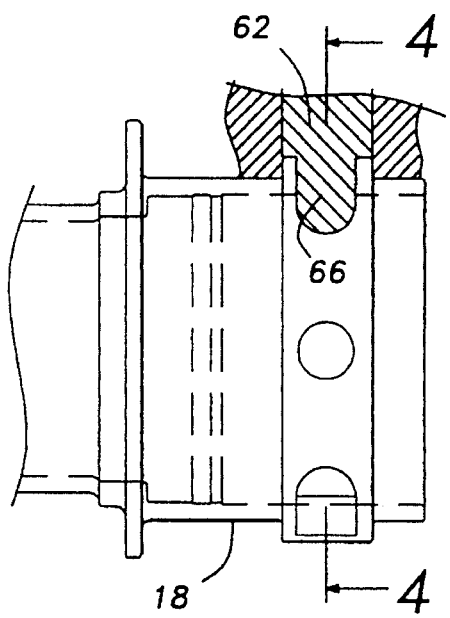
FIG. 3 is a fragmentary longitudinal sectional view illustrating the molding of the coupling housing.

With reference now to FIGS. 3–5, since at least one side wall of each opening 26–36 is substantially perpendicular to the diameter 46, a simple mold having two mold halves 60 and 62 can be used to form the body 18. These mold halves abut together, as shown in FIG. 4, along the predetermined diameter 46 and, in the conventional fashion, move perpendicularly away from the diameter 46 as depicted diagrammatically in FIG. 4. The predetermined diameter is known as the mold parting line.

With reference now particularly to FIG. 4, a single right triangle mold protrusion 64 on the mold halves 60 and 62 are used to form each of the openings 26, 30, 28 and 34. Furthermore, as best shown in FIG. 5, the portion 70 of mold half 62 which forms the side wall 48 of the opening 26 (FIG. 2) is arcuate in shape and extends perpendicularly with respect to the predetermined diameter 46.

From the foregoing, it can be seen that the present invention provides a molded housing for a quick connect coupling which contains six or more spherical retainers and yet can be manufactured using a simple two-part mold and without insertion molding. Having described our invention, however, many modifications thereto will become apparent to those skilled in the art to which it pertains without deviation from the spirit of the invention as defined by the scope of the appended claims.

We claim:

1. A quick connect coupling adapted for connection to a nipple having a radially inwardly extending recess formed at a position spaced from a free end of the nipple, said coupling comprising:

a tubular and cylindrical body open at each end, one end of said body being dimensioned to slidably extend over the free end of the nipple to a connected position, said body having a plurality of circumferentially spaced openings formed at a position spaced from said one end of said body, said openings being in alignment with the nipple recess when the coupling is in said connected position, wherein at least one of said openings is not aligned with a center line bisecting a predetermined diameter of said body, a spherical retainer disposed in each opening of said body, said retainers being movable between a radially inner locked position and a radially outer unlocked position, each retainer having a cross-sectional area greater than its associated body opening on an inside surface of said body, a tubular and cylindrical locking ring positioned coaxially around said body and movable between a retracted and an extended position, said locking ring having an inner cam surface which radially moves said retainers to said locked position as said locking ring moves from said retracted to said extended position, means for resiliently urging said ring towards said extended position, wherein each body opening which is not aligned with said center line bisecting said predetermined diameter of said body has at least one sidewall which extends in a direction which intersects said predetermined diameter at an angle less than or equal to 90° relative to said center line of said body.

2. The invention as defined in claim 1 wherein at least one sidewall of at least one body opening extends substantially parallel to said predetermined diameter of said body.

3. The invention as defined in claim 1 wherein said body is of a one piece molded construction.

4. The invention as defined in claim 3 wherein said body is made of plastic.

5. The invention as defined in claim 1 wherein said body includes at least six body openings equidistantly circumferentially spaced from each other, and wherein two openings are aligned on an axis bisecting said housing and perpendicular to said predetermined diameter.

6. The invention as defined in claim 5 wherein at least four body openings are in the shape of a quarter circle.

7. The invention as defined in claim 1 wherein said body is molded from a two part mold and wherein said parts of said mold abut along said predetermined diameter.

8. The invention as defined in claim 7 wherein said mold parts are movable relative to each other in a direction substantially perpendicular to said predetermined diameter.

9. The invention as defined in claim 1 and comprising an annular fluid seal contained in said body which sealingly engages an outer periphery of the nipple when the nipple is in said connected position.

10. The invention as defined in claim 1 wherein said body is a molded body formed by a two part mold which mold parts abut along said predetermined diameter.

* * * * *